US008521022B1

(12) United States Patent
Sriram et al.

(10) Patent No.: US 8,521,022 B1
(45) Date of Patent: Aug. 27, 2013

(54) DYNAMIC ASSIGNMENT OF WAVELENGTHS IN AGILE PHOTONIC NETWORKS

(75) Inventors: Kotikalapudi Sriram, Marlboro, NJ (US); Mukul Katiyar, Piscataway, NJ (US); Jonathan Titchener, Green Brook, NJ (US); Rajender Rao Nednur, North Brunswick, NJ (US); Anthony Vernon Walker Smith, Ottawa (CA)

(73) Assignee: Alcatel Lucent, Paris (FR)

( * ) Notice: Subject to any disclaimer, the term of this patent is extended or adjusted under 35 U.S.C. 154(b) by 2207 days.

(21) Appl. No.: 10/128,092

(22) Filed: Apr. 23, 2002

Related U.S. Application Data (63) Continuation-in-part of application No. 09/909,265, filed on Jul. 19, 2001.

(51) Int. Cl.
*H04J 14/00* (2006.01)
(52) U.S. Cl.
USPC .............................................................. 398/57
(58) Field of Classification Search
USPC ........................................ 398/48, 49–50, 34
See application file for complete search history.

(56) References Cited

U.S. PATENT DOCUMENTS

| 6,405,284 | B1 * | 6/2002 | Bridge ........................... 711/114 |
| 6,608,709 | B2 * | 8/2003 | Duerksen ......................... 398/43 |
| 6,633,712 | B2 * | 10/2003 | Ramanujam et al. ......... 385/123 |
| 6,674,973 | B2 * | 1/2004 | Leclerc et al. ................ 398/175 |
| 2002/0063915 | A1 * | 5/2002 | Levandovsky et al. ....... 359/110 |
| 2002/0107877 | A1 * | 8/2002 | Whiting et al. ............... 707/204 |
| 2004/0208433 | A1 * | 10/2004 | Cho et al. ........................ 385/24 |

FOREIGN PATENT DOCUMENTS

WO 01/18999 A1 3/2001

OTHER PUBLICATIONS

K. Lee et al., "Multi-Wavelength All-Optical Networks with Wavelengths Outside the Erbium-Doped Fiber Amplifier Bandwidth", Journal of Lightwave Technology, vol. 13, No. 5, May 1995.*
E. Karasan et al., "Effects of Wavelength Routing and Selection Algorithms on Wavelength Conversion Gain in WDM Optical Networks", IEEE/ACM Transactions on Networks, vol. 6, No. 2, Apr. 1998.*

(Continued)

*Primary Examiner* — Shi K Li
(74) *Attorney, Agent, or Firm* — Capitol Patent & Trademark Law Firm, PLLC (57) ABSTRACT

In an automatically switched optical network, the wavelengths are assigned to optical path based on their intrinsic physical performance and on the current network operating parameters. The wavelength performance information is organized in binning tables, based primarily on the wavelength reach capabilities. A network topology database provides the distance between the nodes of the network, which is used to determine the length of the optical path. Other network operating parameters needed for wavelength selection are also available in this database. Once a bin corresponding to the path length is identified in the binning table, the wavelength for that path is selected based on length only, or based on the length and one or more additional parameters. The optical path performance is estimated for the selected wavelength, and the search continues if the estimated path performance is not satisfactory. Several available wavelengths are searched and of those, the wavelength that is most used along the optical path in consideration or alternatively network-wide is selected and assigned. This method helps minimize wavelength fragmentation. The binning tables may have various granularities, and may be organized by reach, or by reach, wavelength spacing, the load on the respective optical path, the fiber type, etc.

17 Claims, 6 Drawing Sheets

(56) References Cited

OTHER PUBLICATIONS

"An Introduction to Data Structures with Applications" by J. Tremblay et al., McGraw-Hill, 1984, pp. 538-539.*

G. Lehr et al, "Management o All-Optical WDM Networks: First Results of European Research Project MOON", NOMS '98. IEEE Network Operations and Management Symposium, vol. 3 Conf. 10, Feb. 15, 1998, pp. 870-879, XP000793435.

Nada Golmie et al, "A Differentiated Optical Services Model for WDM Networks", IEEE Communications Magazine, vol. 38, No. 2, Feb. 2000, pp. 68-73, XP000912316.

Nasir Ghani et al, "On IP-over-WDM Integration", IEEE Communications Magazine, vol. 38, No. 3, Mar. 2000, pp. 72-84, XP011091247.

Wolfgang Mader et al, "Results of the PHOTON and MOON Field Trials", OFC/IOOC '99. Optical Fiber Communication Conference/International Conference on Integrated Optics and Optical Fiber Communication, Feb. 21, 1999, pp. 234-236, XP000967039.

Ramaswami et al, Design of logical topologies for wavelength-routed optical networks, IEEE Journal of Selected Areas in Communications 14 (5), Jun. 1996.

Zhang et al, A heuristic wavelength assignment algorithm for multihop WDM networks with wavelength routing and wavelength re-use, IEEE/ACM Transactions on Networking 3 (3), Jun. 1995.

Mokhtar et al, Adaptive techniques for routing and wavelength assignment in all-optical WANs, IEEE, 1997.

Kim et al, Regenerator placement algorithms for connection establishment in all-optical networks, IEE Proceedings. Communications 148 (1), Feb. 2001.

Banerjee et al, A practical approach for routing and wavelength assignment in large wavelength-routed optical networks, IEEE Journal of Selected Areas in Communications 14 (5), Jun. 1996.

Jukan et al, Service-specific resource allocation in WDM networks with quality constraints, IEEE Journal of Selected Areas in Communications 18 (10), Oct. 2000.

* cited by examiner

DYNAMIC ASSIGNMENT OF WAVELENGTHS IN AGILE PHOTONIC NETWORKS

PRIORITY PATENT APPLICATION

This patent application is a continuation-in-part of co-pending U.S. patent application Ser. No. 09/909,265 ("'265 Application"), entitled "Wavelength Routing And Switching Mechanism For A Photonic Transport Network", by Smith et al, filed Jul. 19, 2001, assigned to Innovance Networks, and incorporates by reference herein the disclosure of the '265 Application as if set forth in full herein.

RELATED US PATENT APPLICATIONS

U.S. Patent Application Ser. No. 10/017,833 ("'833 Application") entitled "Wavelengths Assignment In An Optical WDM Network", by Solheim et al, filed Dec. 12, 2001 assigned to Innovance Networks, and U.S. patent application Ser. No. 10/097,901 ("'901 Application") entitled "Regenerator Placement Mechanism For Wavelength Switched Optical Networks" by Rider et al, filed Mar. 13, 2002 and assigned to Innovance Networks.

FIELD OF INVENTION

The invention is directed to an agile photonic network (also known as automatically switched optical network ASON, or as all optical network), and in particular to a system and method for assigning wavelengths to a connection in such networks.

BACKGROUND OF THE INVENTION

The most relevant trends in the optical networking area are the increase in the network capacity and the increase in transmission reach. A higher network capacity is obtained by increasing the channel rate and multiplexing more traffic in time domain, known as TDM (time division multiplexing), and/or by increasing the channel density, known as WDM (wavelength division multiplexing).

Advances in transmitter and receiver design, evolution of optical amplification, employment of distributed Raman amplification combined with various dispersion compensation techniques, new encoding and modulation techniques, digital wrapper technology, etc., enabled development of ultra-long reach ULR networks, where an optical signal needs to be regenerated at 3,000 km or more.

However, current WDM networks use point-to-point connectivity, where all channels are OEO (optical-to-electrical-to-optical) converted at each node. In this architecture, the advantages of the ULR cannot be fully exploited. Thus, OEO conversion at all intermediate nodes along a trail is not necessary in the majority of cases, since the modern ULR techniques allow optical signals to travel distances greater than the distanbe between two or more successive nodes without regeneration. Thus, important cost savings may be obtained by eliminating the equipment used for the unnecessary OEO conversion.

There is a need to reduce the cost of the network nodes by maximizing the distance traveled by the signals in optical format, to take advantage of the emerging ULR techniques and to provide a more efficient use of the network equipment.

There is a trend towards a new generation of optical networks, that will provide the customers with the ability to automatically establish an end-to-end connection at a push of a button. This new architecture has, among numerous other advantages, the ability to treat each connection differently, so as to provide the respective user with an individualized class of service, with the corresponding revenue differentiation. End-to-end connection granularity means that the nodes of the network need to be able to switch the connection in optical format, while automatically regenerating the signal only when necessary. This approach dramatically reduces the node complexity, and consequently the network cost.

Automatic switching and regeneration result in regenerators and wavelengths becoming two of the most important resources of the photonic networks. In general, they could be allocated to a connection according to certain rules, which are mostly dictated by the class of service for the respective connection, and by the particular architecture of the network. Methods to economically use these resources and minimize blocking of new connection requests are crucial to cost reduction and operational efficiency of photonic networks.

Determination of the number of regenerators and their nodal allocations is one aspect of efficient resource management in photonic networks. Regenerators need to be switched into an end-to-end connection so that the signal is regenerated and restored to superior quality before propagation and transmission impairments corrupt the signal entirely.

Further, in switched optical networks, the selection and assignment of the right wavelength to each optical path for the best possible utilization of available wavelengths depends on several factors. These factors include (a) maintaining a current view of the current network connectivity; and (b) since "not all wavelengths are equal", providing the network with the knowledge of the individual wavelength performance.

Knowing the current wavelength allocation allows the network to select one or more unused wavelengths to serve a new connection. This is even more important having in view that this allocation is dynamic, the connections being set-up and removed by users at arbitrary moments. Knowing the individual performance of all wavelength available in the network and the pertinent topology information (fiber type, link loading, etc), allows matching a wavelength to an optical path, which allows further reduction of the network costs.

Nonetheless, the selection and assignment of the right wavelength for each optical path for the best possible utilization of available wavelengths is a complex problem. A meaningful solution to this complex problem is needed to facilitate the best possible use of wavelengths as a resource while satisfying connection setup demands.

SUMMARY OF THE INVENTION

It is an object of the invention to provide an agile network with dynamic assignment of wavelengths to an end-to-end connection.

According to one aspect of the invention, an automatically switched optical network operating according to a wavelength plan is provided with a method of assigning a wavelength to an optical path, comprising: organizing all wavelengths provided by the wavelength plan in a binning table according to the natural wavelength reach and a specified wavelength parameter; determining the length of the optical path and the value of the wavelength specific parameter for that optical path; and searching the binning table to select a wavelength for the optical path based on availability of the wavelength on the optical path, the length of the optical path and the value of the parameter.

According to another aspect, the invention provides a routing management block that comprises means for storing wavelength performance information; means for storing updated network resources information; and a wavelength assignment module for determining the length of an optical path based on the updated network resources information and selecting a wavelength for the optical path based on the wavelength performance information.

Still further, the invention provides an automatically switched optical network operating according to a wavelength plan with a binning table that includes wavelength performance information, the binning table comprising a plurality of reach bins, a reach bin comprising one or more wavelengths classified according to a reach range; and, in each the reach bin, a plurality of sets, each the set comprising one or more wavelengths organized according to a wavelength performance parameter.

Additionally, the invention deals with determination of the most used of the available wavelengths over an optical path, and assignment of the most used wavelength to the optical path in order to minimize wavelength fragmentation. The notion of "most used" can be applied only over the optical path in consideration or over the network as a whole. One novel aspect of the present invention is the way the concept of minimization of wavelength fragmentation is used in conjunction with navigation of wavelength-binning tables in the context of switched optical networks.

Advantageously, the wavelength assignment mechanism according to the invention allows fast, automatic establishment of new connections based on the current network architecture, connectivity and loading and also on conditions in the connection request. Finding an appropriate wavelength-path match is performed in a meaningful way, using searching techniques with various degrees of sophistication. Selection of a wavelength for each optical path is performed with optimal use of current network resources, while ensuring that the quality of the selected trail is adequate for the respective call.

The wavelength searching and selection techniques according to the invention allow reducing the time-to-bandwidth (TTB). Furthermore, the wavelength searching and selection techniques are designed with a view to reduce network resource utilization, by minimizing wavelengths fragmentation, which lowers the need for regenerators, reduces call blocking, and hence contributes to network service costs reduction, while increasing the quality-of-service.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENTS

The following description is of a preferred embodiment by way of example only and without limitation to combination of features necessary for carrying the invention into effect.

The following definitions are used throughout this specification:

"Dial", "Redial", "Call" or "connection request" refers to a request for exchanging traffic between two nodes. It includes conditions such as the source and destination nodes, traffic bandwidth and rate, the class of service CoS, the type of routing, explicit constraints, etc.

"Photonic network" is a network where an end-to-end connection is established along a trail whereby the traffic may be automatically switched at all or some intermediate nodes in optical format. The nodes of a photonic network could be optical add/drop multiplexing (OADM) nodes that provide add, drop and optical passthrough, or could be optical cross-connect nodes that provide add, drop and optical switching of the passthrough traffic.

A "connection" is a logical route from a source node, generically referred to as node A to a destination node, generically referred to as node Z. A "route" or "trail" refers to a specific route for the A-Z connection.

A "wavelength plan" refers to the set of wavelengths available network-wide. A wavelength plan specifies the telecommunication window on which the network operates (e.g. C-band, L-band), the wavelengths available in the respective window, and the wavelength spacing, etc. For example, the wavelength plan could provide ~100 wavelengths on a 50 GHz grid from 1567 nm to 1610 nm (i.e. L-band) which yields ~1 Tb/s per optical line amplifier.

A "regeneration node" is a node that OEO converts the traffic on the route passing through that node for wavelength conversion (relevant to this invention) or signal conditioning. The photonic network to which this invention applies (hereinafter referred as the "photonic network") has the ability to determine if a connection needs wavelength conversion (or/and traffic regeneration), looks for a regenerator available at one or more intermediate nodes along the A-Z trail and allocates regenerator(s) to the respective route to correctly deliver the signal to its destination. To this end, some or all nodes of the photonic network are provided with a pool of regenerators that are automatically switched into a connection as needed. Since the regenerators and the wavelength converters of the photonic network have a similar hardware design, they are collectively referred to in this specification as regenerators.

An "optical path" or "regenerator segment" refers to the fiber and the equipment between a transmitter and the next receiver, i.e. between two successive regenerators.

A "link" refers to the equipment (could be optical amplifiers, dispersion compensators, etc) and fiber between two successive photonic nodes. A link may include one or more fibers and the associate equipment.

The term "loading" is a measure of the number of channels carried by a certain fiber/link. "Wavelength spacing" provides the distance between two consecutive wavelengths. Link loading and wavelength spacing are inter-related notions.

"Network topology information" includes information on network equipment and connectivity, fiber type for each link, wavelengths availability per link, the number and type of transponders and regenerators at each node and their availability, etc. It is generically illustrated by data topology system DTS 15 in FIG. 1.

Figure 1:
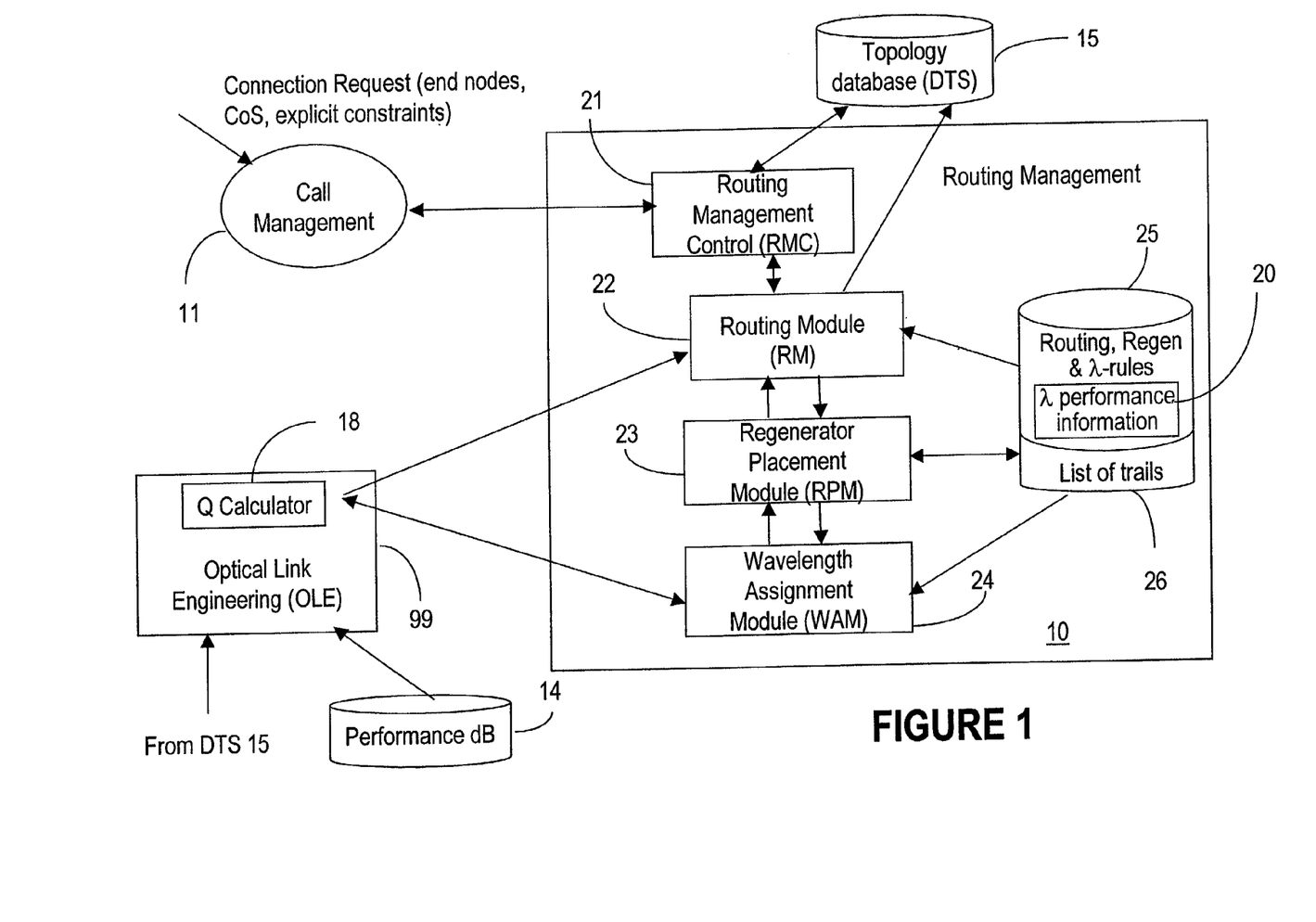
FIG. 1 shows the main modules involved in the routing and switching services of a photonic network, and their interaction.

FIG. 1 is a logical overview of a network and element management system for a photonic network, showing the modules pertinent to the invention. A detailed description on how the routing and switching mechanism of FIG. 1 operates is provided in the '265 Application, which is the parent application of the present application. A brief description follows.

A call management block 11 provides a routing management RM 10 with a connection request that specifies the source node A and the sink node Z. A request also defines certain conditions, and generally includes constraints associated with the class of services (CoS) of the call/user.

Routing management platform 10 comprises a routing module (RM) 22, a regenerator placement module (RPM) 23 and a wavelength assignment module (WAM) 24. After receiving the call from block 11, a routing management controller (RMC) 21 operates modules RM 22, RPM 23 and WAM 24 to generate a list 26 of possible best trails between nodes A and Z. The RMC 21 analyzes and orders the trails according to their cost and/or chances of success, and returns them to call manager 11 one by one. Block 11 attempts to set-up the connection along one of these trails; if the first trail on the list fails to set-up, block 11 requests the next trail from list 26 and so on, until a trail is successfully setup.

RPM 23, which is the subject of the '901 Application, decides where to place regenerators along the A-Z trail based on regenerator and wavelength availability. As described in patent application the '901 Application, RPM 23 also has the ability to change an initial placement of regenerators taking into account the distance-dependent nature of the wavelengths.

The WAM 24 assigns wavelengths to each optical path of the respective end-to-end A-Z trail, based on wavelength rules 25, wavelength availability from DTS 15, and on pre-stored information about wavelength performance, as shown at 20. Thus, the wavelength assignment mechanism addresses wavelength contention in order to reduce wavelength blocking; considers wavelength-reach performance of the available channels; and assigns wavelengths with appropriate reach profiles for each optical path of the respective route.

Since the trail performance cannot be determined until after the wavelength assignment module (WAM) 24 assigns wavelengths to each path of the trail, RPM 23 may invoke WAM 24 multiple times for corroborating the decisions regarding the placement of regenerators with the optimal wavelength assignment, as these two modules 23, 24 perform inter-dependent functions.

A Q calculator 18 is available for use by the modules of the routing management platform 10. The Q calculator is a module provided by the optical link engineering (OLE) module 19, for calculating a quality factor Q based upon knowledge of the topology from DTS 15, optical devices specified and measured parameters generically shown by database 14.

During route selection, Q-calculator 18 estimates the Q value for each trail in the list 26 so that the routing management can order the trails based on this value. When a wavelength is considered for an optical path, its estimated optical quality, or Q value, is used to determine the acceptability of the wavelength. If the estimated $Q_{est}$ value falls short of a required $Q_{th}$ value, then the wavelength is not selected for that path. Alternatively, both RPM 23 and WAM 24 collectively attempt some corrective measures for enhancing the end-to-end performance of the respective trail, to avoid searching for a new trail.

At the time the connection is set-up, Q calculator 18 determines a measured Q value $Q_{meas}$, which reflects the optical path conditions in the network more realistically. If $Q_{meas} < Q_{th}$, RPM 23 and WAM 24 collectively attempt some corrective measures, or the trail is abandoned in favor of another one from list 26.

Figure 2A:
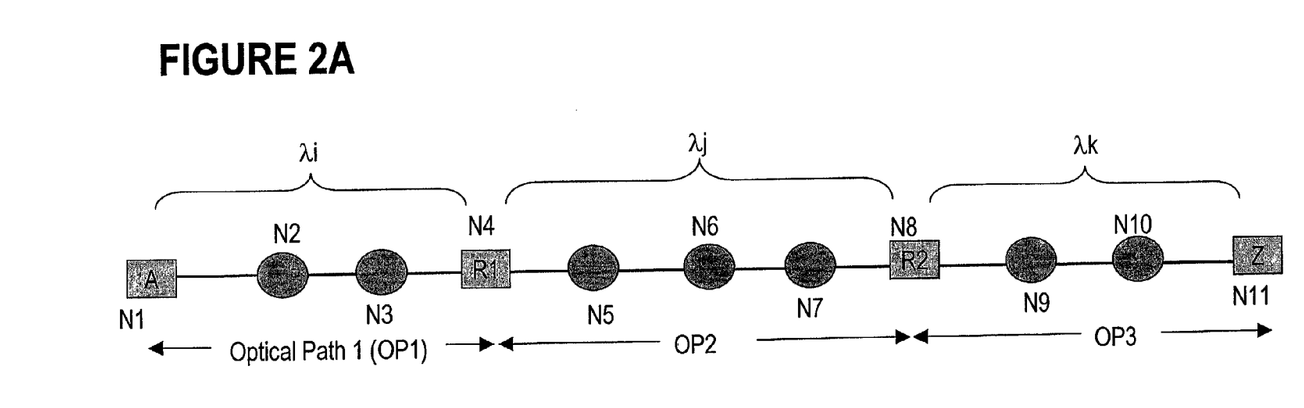
FIG. 2A shows a plurality of optical paths for an end-to-end A-Z trail, including regenerating nodes.
Figure 2B:
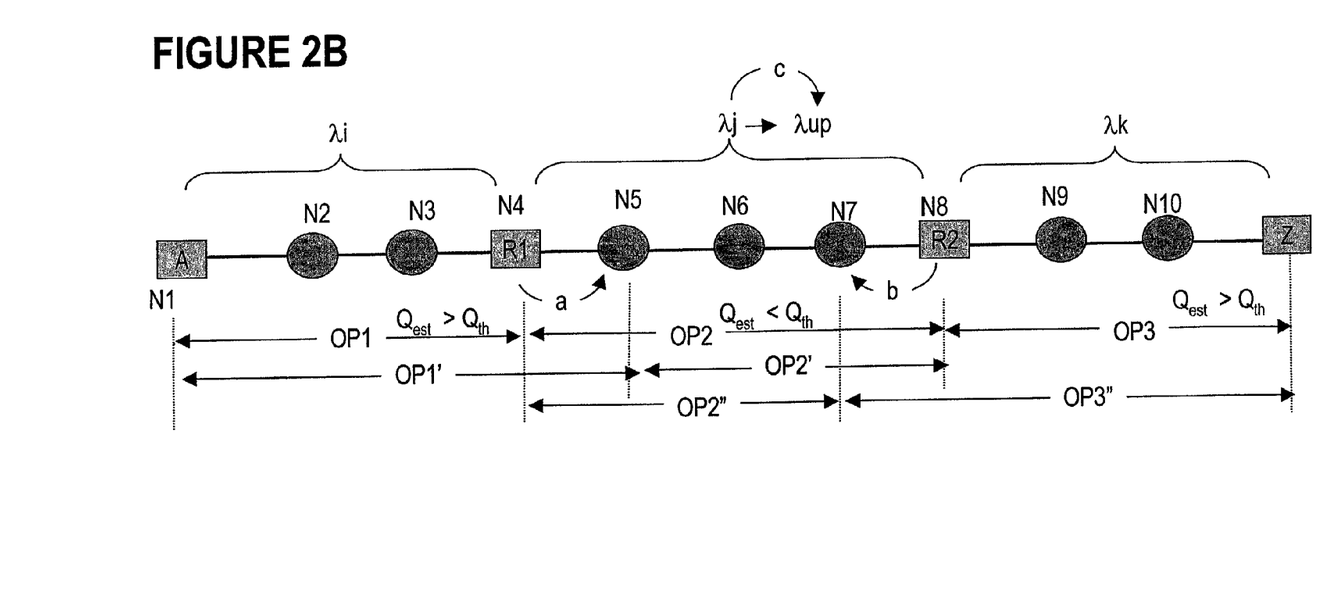
FIG. 2B shows some ways to enhance performance of A-Z trail of FIG. 2A.

FIGS. 2A and 2B are provided for a brief description of the RPM 23 and WAM 24 interaction. FIG. 2A shows an end-to-end connection from node N1 to node N11 routed along an A-Z trail. The source and destination nodes have transponders, which are optical terminals (a long reach transmitter Tx-receiver Rx pair), for adding on or dropping off a connection to/from the switched optical network from/to the network clients. In the example of FIG. 2A, A-Z trail uses two regenerators (wavelength converters) R1 and R2 located at nodes N4 and N8, so that A-Z trail has three optical paths, denoted with OP1, OP2 and OP3. As also shown in FIG. 2A, a continuous wavelength λi, λj, and λk is allocated to each respective optical path, as seen later. R1 is switched in the trail since λi is not available on link N4-N5 (e.g. is used by another connection on link N4-N5, or cannot reach node Z), and R2 is provided since λj is not available on link N8-N9 (e.g. is used by another connection on link N8-N9, or cannot reach node Z)

After WAM 24 performed an initial wavelength assignment, the Q calculator (18 in FIG. 1) provides an estimate $Q_{est}$ of the quality of all optical paths OP1, OP2 and OP3 for the selected wavelength set. If all $Q_{est}$ values exceed a predetermined threshold $Q_{th}$ ("pass"), the trail A-Z passes the quality test and wavelengths λi, λj, and λk are selected and assigned to OP1, OP2, OP3, respectively.

However, if as FIG. 2B shows, $Q_{est}$ on OP2 (λj) is less than $Q_{th}$, a number of options are available to address this problem. As shown by arrow "a", RPM 35 may shorten OP2 by "re-placing" regenerator R1 from node N4 to node N5, so that path OP2 gets a better chance of passing the Q test. Thereafter, Q calculator 18 determines the new $Q_{est}$ values for OP1' (N1 to N5), OP2' (N5 to N8), and if these pass $Q_{est} > Q_{th}$), wavelength set λi, λj, and λk is selected.

If either of OP1' and OP2' fails, R1 is returned at node N4 and RPM 35 "re-places" the regenerator R2 to the previous node, i.e. from node N8 to node N7, again to shorten OP2. This is shown by arrow "b". Q calculator 18 determines the new $Q_{est}$ values for OP2" (N4 to N7), OP3" (N7 to N11), and if these pass ($Q_{est} > Q_{th}$), wavelength set λi, λj, and λk is initially selected.

If one of the new $Q_{est}$ values "fails", R1 and R2 are maintained as in the initial regenerator placement solution, and WAM 24 attempts to upgrade wavelength λj to $\lambda_{up}$, as shown by arrow "c". This means that a wavelength $\lambda_{up}$ with a higher reach, if available, is selected and proposed for possible assignment for the problem link OP2. If $Q_{est}$ on OP2 passes for the upgraded wavelength, the wavelength set $\lambda_i$, $\lambda_{up}$, and λk is selected to service the A-Z connection.

However, if the upgraded wavelength $\lambda_{up}$ also "fails", then the RPM 23 may decide to add one more regenerators to the A-Z trail to create four optical paths with shorter distances. Then, the steps of the basic method described above are repeated for the new optical paths. It is also to be noted that a wavelength upgrade may be attempted before regenerator re-placement; it could result in a less time consuming solution.

It is also to be noted that similar corrective actions may be performed if the set-up of a selected trail fails.

WAM 24 is designed having in mind network resource optimization (e.g. regenerators and wavelengths) and also reduction of the path/route computational times, with the ultimate goal of saving costs. The selection and assignment of an optimal wavelength for each optical path can be performed using intelligent methods, by providing the WAM with:

(1) a priori wavelength performance information, organized for various types of searches, and various granularities.

(2) ways of systematic navigation of the wavelength performance information for searching and selecting an appropriate wavelength for an optical path, and (3) methods of optimizing the wavelength selection at the optical path level, or/and at the network level.

Providing and Organizing Wavelength Performance Information

Wavelengths differ from each other in their optical characteristics, such as dispersion, noise figure, etc. Characteristics exhibited by a particular wavelength also generally differ if propagated over different fiber types. Based on these characteristics, the wavelengths may be grouped in sections of reach (also called here bins), where each section corresponds to a different range of reach distances. The wavelength performance information to be accounted for can be expanded to include other intrinsic characteristics of the transmission medium beyond the reach, so as to obtain bins with a finer granularity. According to an embodiment of the invention, the wavelength performance information 20 is for example arranged in tables with rows, columns, cells and stored in the database 25 for consultation by the wavelength assignment module 24. It is to be noted that the tables may be stored in any other location that is accessible to WAM 24. While it is also possible to use alternative ways of presenting and accessing this information, it is important to set it according to the type, extent and granularity of the search. The term table is used generically to identify any such organized wavelength performance data.

Table 1 is an example of a wavelength-binning table organized according to the wavelength reach range only. This table provides information regarding all wavelengths that are projected to traverse various distance ranges in a fiber, i.e. 0-250 km, 251-500 km, etc., while meeting a certain optical signal quality requirement, e.g. the above mentioned $Q_{th}$. This information does not take into account operational issues such as dirty fibers.

TABLE 1

| Reach Range R(j) Ordered Search Set | 1<br>1-250 km | j-1<br>251-250 km | j<br>501-750 km | j+1 | M<br>4251-4500 km |
|---|---|---|---|---|---|
| 1 1$^{st}$ Search Set | λ_Set(1, 1) | | λ_Set(1,, j) | | λ_Set(1, M) |
| 2 2$^{nd}$ Search Set | λ_Set(2, 1) | | λ_Set(2,, j) | | λ_Set(2, M) |
| 3 3$^{rd}$ Search Set | λ_Set(3, 1) | | λ_Set(3,, j) | | λ_Set(3, M) |

The bins may be further categorized in accordance with wavelengths spacing. One characteristic of the optical signals is the cross phase modulations (XPM). Due to XPM, the optical signals that are of similar frequencies degrade each other's performance. As the wavelengths get "closer", the signal degradation increases due to an increased XPM.

It is therefore advantageous to pre-arrange the order in which the optical channels are assigned to a connection A-Z by organizing in advance the sequence in which wavelengths in one bin are proposed for allocation. For example, wavelengths with wider spacing should be used to setup optical connections initially, when the network is commissioned, and wavelengths with narrower spacing should be used to setup optical connections later.

Table 2 illustrates a wavelength-binning table organized according to wavelength reach range and wavelength spacing. Here, the wavelengths are grouped in columns of reach and three rows for three different spacing values, i.e. 50, 100, and 200 GHz.

TABLE 2

| | | 1 | | j − 1 | j | j + 1 | | M |
|---|---|---|---|---|---|---|---|---|
| | Reach Range R(j) | 1-250 km | | 251-250 km | 501-750 km | | | 4251-4500 km |
| | Ordered Search Set | | | | | | | |
| 1 | 1$^{st}$ Search Set 2000 GHz spacing | λ_Set(1,1) | | | λ_Set(1,j) | | | λ_Set(1,M) |
| 2 | 2$^{nd}$ Search Set 100 GHz spacing | λ_Set(2,1) | | | λ_Set(2,j) | | | λ_Set(2,M) |
| 3 | 3$^{rd}$ Search Set 50 GHz spacing | λ_Set(3,1) | | | λ_Set(3,j) | | | λ_Set(3,M) |

Each link or fiber in the optical path has a bad, which is defined as the ratio between the total number of wavelengths in use divided by the sum of unassigned wavelengths and those in use. This ratio is preferably expressed as a percentage. The notions of wavelength-spacing or load values are inter-related. To achieve a load-balanced wavelength fill on a link, the wavelengths in each reach bin could be grouped into loading bins. Load-balanced wavelength fill refers to using larger spacing between assigned wavelengths at lower loads and then making use of the wavelengths in-between as the load increases. The bins may also be categorized according to link load values as shown in Table 3.

TABLE 3

|   |                                  | 1            | j − 1      | j          | j + 1 | M            |
|---|----------------------------------|--------------|------------|------------|-------|--------------|
|   | Reach Range R(j)                 | 1-250 km     | 251-250 km | 501-750 km |       | 4251-4500 km |
|   | Ordered Search Set               |              |            |            |       |              |
| 1 | 1st Search Set 0-25% load range  | λ_Set(1,1)   |            | λ_Set(1,j) |       | λ_Set(1,M)   |
| 2 | 2nd Search Set 26-50% load range | λ_Set(2,1)   |            | λ_Set(2,j) |       | λ_Set(2,M)   |
| 3 | 3rd Search Set 51-100% load range| λ_Set(3,1)   |            | λ_Set(3,j) |       | λ_Set(3,M)   |

The columns in Table 3 correspond to reach ranges, and the rows correspond to link load ranges, i.e. 0-25%, 26-50% and 51-100% link loads, respectively. For the same reach (the sets in the same column), the sets for higher load include the sets for lower loads. For example, the wavelength set λ_Set(2, j) contains λ_Set(1, j), while λ_Set(3, j) contains λ_Set(2, j) and λ_Set(1, j).

Since the optical characteristics of different fiber types (e.g. TrueWave™, LEAF™, DSF, etc.) vary, different fiber types generally have different wavelength binning tables. Tables 4A and 4B show examples of how the wavelengths in each bin of the spectrum used in the network are equidistantly spaced by increments of four, two, or one, based on load for TrueWave™ and LEAF™ fibers, respectively.

TABLE 4A

| True Wav | Route Length | | |
|---|---|---|---|
| % Loaded | <1000 km | 1000 km-2000 km | 2000 km-3500 km |
| 0-25% | 1, 5, 9, 91, 95, 99 | 11, 15, 19, 23, 27, 31, 39, 43, 81, 85, 89 | 47, 51, 55, 59, 63, 67, 71, 75, 79 |
| 26-50% | Above + 3, 7, 93 | Above + 13, 17, 21, 25, 29, 33, 37, 41, 43, 45, 83, 87 | Above + 49, 53, 57, 61, 65, 69, 73, 77 |
| 51-100% | any 1-10 or 91- | any 11-45, 81-90 | Any 46-80 |

TABLE 4B

| LEAF | Route Length | | |
|---|---|---|---|
| % Loaded | <1000 km | 1000 km-2000 | 2000 km-3500 km |
| 0-25% | 3, 99 | 5, 9, 85, 89, 93 | 13, 17, 21, 25, 29, 33, 37, 41, 45, 49, 53, 57, 61, 65, 69, 73, 77, 81 |
| 26-50% | Above + 1, 5, 97, 99 | Above + 7, 87, 91, 95 | Above + 11, 15, 19, 23, 27, 31, 35, 39, 43, 47, 51, 55, 59, 63, 67, 71, 75, 79, 83 |
| 51-100% | any 1-5 or 96-100 | any 11-45, 8 90 | Any 10-84 |

Tables 20 can be constructed based on fiber link engineering studies, fiber measurements and analysis. More fine-grained versions, where for example the reach range are on the order of a few hundred kilometers or less, can also be prepared. A fine-grained table is based on narrow ranges of reach values. Presently, the wavelength reach tables are coarse-grained in their reach range values, e.g. reach range bins are ~1000 km wide. The granularity of these tables is changing based on new fiber measurements and analysis. It is anticipated that these tables will become fine-grained in the near future, with the reach range on the order of a few hundred kilometers or less.

Thus, tables 20 may be updated/expanded as more accurate and additional information on various performance parameters of the transport medium (the fiber) become available.

Other versions of the tables may be used, and some examples are described next. The nodes of the photonic network are generally provided with a drop tree, for demultiplexing and routing the drop channels (local traffic) to the local user. The drop tree may use for example a gateway input/output GIO module that distributes selectively the channels to an associated receiver, and a GIO with a tunable post compensator TPC, which enables extended reach for a range of wavelengths. Such a GIO is referred to as a GIO-ER. Since the node is provided with these two hardware options, the wavelength reach tables may be further modified to reflect these options. If a GIO-ER is available, then a wavelength can appear twice in the wavelength-binning table, in two different reach bins depending on the gateway device used.

Figures 3A, 3B:
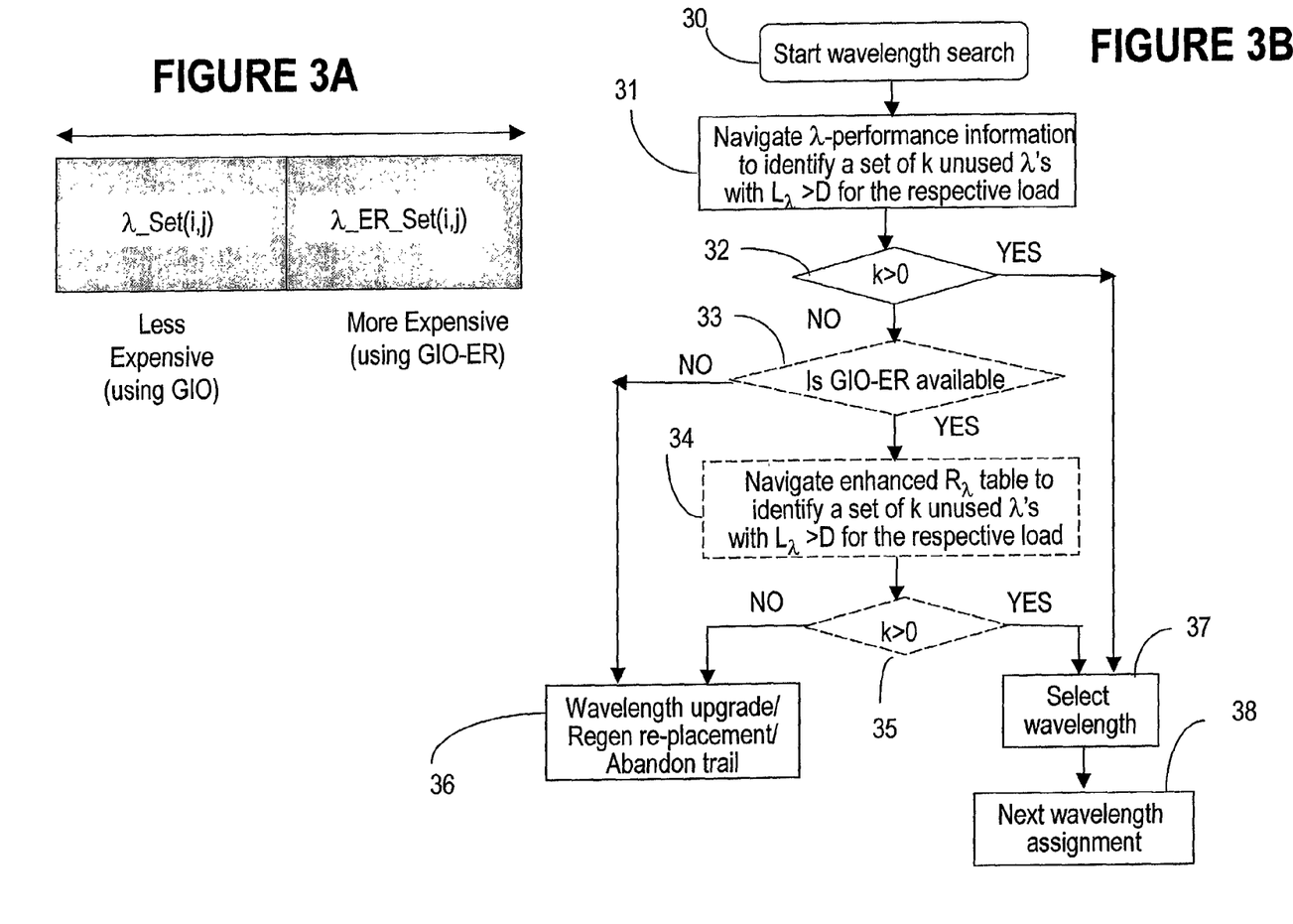
FIG. 3A shows an example of a cell of a complex wavelength-reach table.
FIG. 3B is a flowchart illustrating a method of selecting a wavelength using tables as shown in FIG. 3A.

As shown in FIG. 3A, each (i,j)-bin in a wavelength reach table can now be divided into two bins, one of which contains a set of wavelengths, λ_Set(i,j), corresponding to a configuration that uses GIO, and the other contains a set of wavelengths, λ_ER_Set(i,j), corresponding to use of GIO-ER. This modification to the wavelength reach tables results in slight changes to the way the tables are navigated.

FIG. 3B is a flowchart illustrating a method of selecting a wavelength using tables as shown in FIG. 3A. The RPM 23 requests a wavelength search for a specified trail. In step 31, the WAM 24 searches the wavelength performance information 20 to find a set of wavelengths that are available and suitable for the trail. As discussed above, the wavelength performance information may be organized in tables, or in other formats suitable for searches. If table navigation failed to return a wavelength for the respective optical path, branch NO of decision block 32, then in at step 33, WAM 24 checks if a GIO-ER is available at both end-nodes of the optical path.

If k>0 as shown by branch YES of decision block 32, a wavelengths is selected for the respective OP, step 37, according to the rules described next, and the routing management 10 proceeds with the next operation, step 38.

If there is no available GIO-ER at one end, branch NO of decision block 33, it is concluded that no wavelength is available at all for this optical path, and a regenerator replacement, or a wavelength upgrade are tried, step 36. If none of these corrective actions returns a wavelength for the respective optical path, the trail may be abandoned in favor of the next one on list 26.

If there are available GIO-ERs, branch YES of decision block 33, a modified wavelength reach table as illustrated in FIG. 3A is searched in step 34 to determine wavelength availability in sub-bins containing wavelengths with improved, higher reach denoted with λ_ER_Set(i,j). Once one or more (k>0), wavelengths were identified in this table, branch YES of decision block 35, the WAM selects a respective wavelength, step 37 and the routing management 10 proceeds with the next operation, step 38. If no wavelengths are found (k=0), the WAM returns operation to RPM 23, step 36 as shown by branch NO of decision block 35.

It is recommended to use the GIO device as a default case whenever a wavelength is available, as the GIO-ER variant is more expensive. To show this, FIG. 3B illustrates the steps involving GIO-ER in dotted lines.

Searching for an Appropriate Wavelength for an Optical Path

The ways the wavelength performance information is used (step 31 on FIG. 3B) depends on the connection request, the characteristics of the selected trail, the type and granularity of the wavelength performance information (wavelength binning tables), the time allocated to the search (navigation through a table) for a valid wavelength, etc. When only the length (D) of an optical path is known, the search is performed in Table 1 starting in column (j) where the wavelength reach R(j) corresponds to the length of the optical path D, and k wavelengths with R(j)≧D are returned by the search. For example, the unused wavelengths in the bin with 501 km<R(j)<750 km are considered for an optical path that has 700 km.

Table 2 is used when the reach of all wavelengths for various wavelength spacing is known. To perform a search, the entry cell is given by the respective reach column R(j), in a row corresponding to the widest wavelength-spacing, i.e., 200 GHz. Then the search continues through the bins corresponding to the immediate next wider spacing within the same column (j) and so on until all cells in column (j) are examined. If no available wavelength is found in column (j), the search extends to column (j+1) corresponding to the next higher reach range and the widest spacing, as shown by the arrow.

When the length of the link D and the link loading are provided, Table 3 is used. Use of Table 3 helps to keeps the cross-phase modulation (XPM) to the minimum, as the loads are constantly monitored and available wavelengths are picked such that XPM is kept to a minimum. Still, XPM cannot be completely avoided at higher loads, but the present technique allows for smooth increase in XPM without adverse effects as the load increases. The entry cell can be determined according to D, or according to both D and load.

For a D-only search, the search starts preferably from the bin, or cell within the column with an appropriate reach, in a row corresponding to the lowest load, e.g. 0-25%, and continues through bins corresponding to the immediate next higher load within the same column. For example, as shown on Table 3, if the optical path has 400 km, the search for an unused wavelength for that path starts with bin λ_Set(1,j); the wavelengths in column (j) provide a reach between 251 and 500 km, and result in the lowest loading.

If no acceptable wavelength is found in column (j), the search moves to the bin corresponding to the next higher reach range (j+1), starting again with the lowest link load in cell (bin) λ_Set(1,j+1), as indicated by the arrow in Table 3.

Alternatively, this search may start from the cell designated by reach, also using an estimated load calculated based on the current link load values. It is to be noted that an optical path may include multiple links, and sometimes multiple fibers between two adjacent nodes. A method for determining the effective current load for an optical path is described later.

This systematic way of navigating through the wavelength-binning tables allows for organized, time saving searches to find and validate a group of available wavelengths suitable for assignment to an optical path.

Each time a wavelength is considered for assignment to an optical path, its estimated optical quality or $Q_{est}$ value is used to determine the initial acceptability of the wavelength, as described above in connection with FIG. 2B. This procedure is repeated until k acceptable wavelengths are found. k is programmable, and selected so as to limit the number of acceptable wavelengths and the search time.

Optimizing the Wavelength Selection

WAM attempts to select the best wavelength out of the k acceptable wavelengths based on rules. For example, it is advantageous to select wavelength from the most used wavelengths in the network, in order to minimize the wavelength fragmentation, which results in better network economics. This is mainly because less fragmentation results in a lower number of regenerators needed for wavelength conversion. A lower wavelength fragmentation also reduces the call (connection) blocking.

The most used wavelengths can be determined considering only the wavelengths usage on the cross-links relative to the optical path under consideration, or by considering the wavelengths usage on all links in the network.

Figures 4A, 4B, 4C:
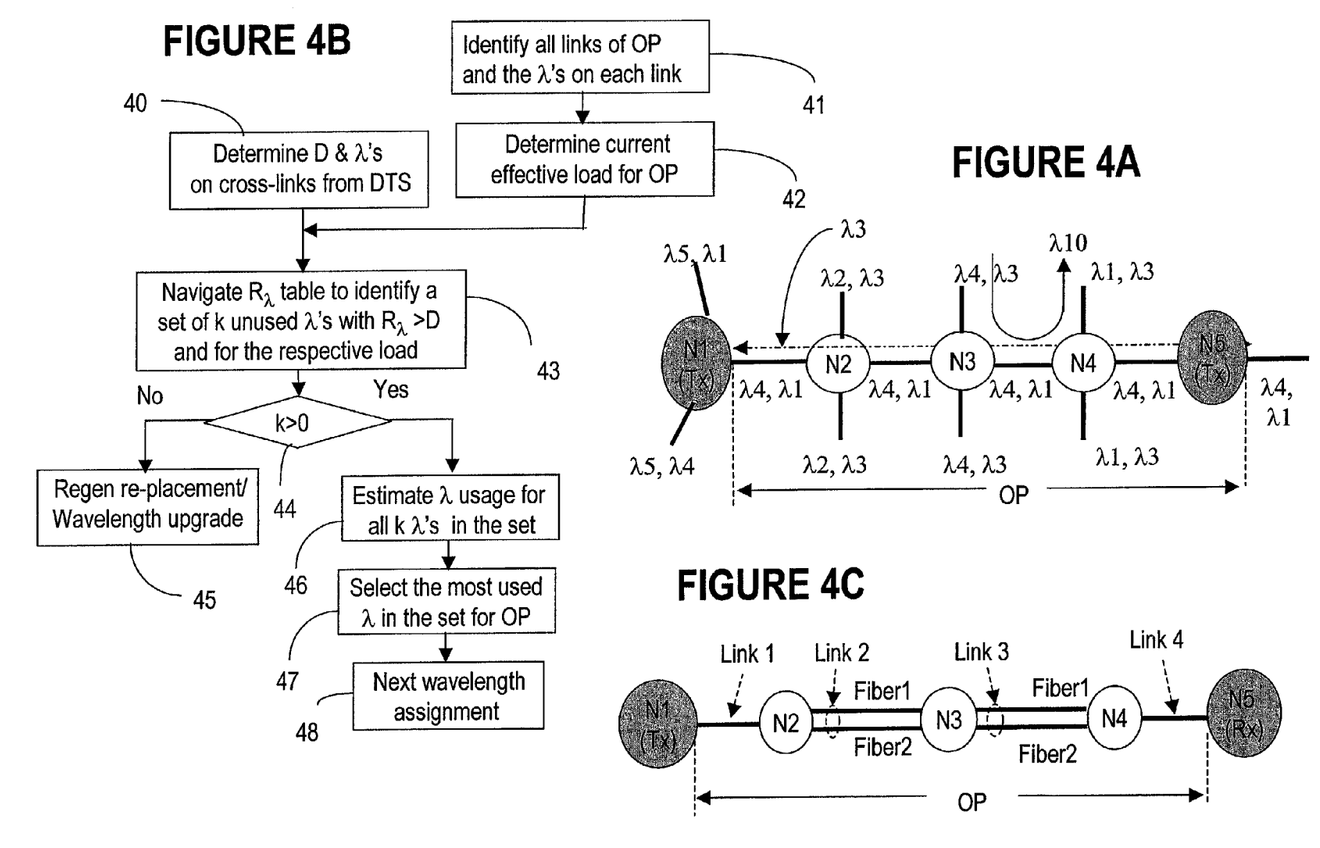
FIG. 4A illustrates how wavelength fragmentation is addressed in the context of an optical path.
FIG. 4B is a flowchart illustrating a method for minimizing wavelength fragmentation in the context of an optical path.
FIG. 4C shows an optical path with multiple links (hops) and multiple fibers on some of the links.

FIG. 4A illustrates an example of an optical path OP connecting nodes N1 to N5; the transmitter Tx at node N1 and the receiver Rx at node N5 can be the respective terminal of a transponder or a regenerator. In this example out of five wavelengths λ1 to λ5, wavelengths λ1 and λ4 are already used on this path by other connections, so that the set of k wavelengths that are available for a new connection include λ2, λ3 and λ5. Of these available wavelengths, this example also assumes that, λ2 is used on two cross-links (at node N2), λ3 on six cross-links (at node N2, N3 and N4), and λ5 on two cross-links (at node N1). It is apparent that in this example X3 is most used relative to the optical path. Hence, assigning λ3 to for the new optical path, rather than λ2 or λ5 is most beneficial, because it minimizes fragmentation of wavelengths λ2 or λ5.

FIG. 4B is a flowchart of a method for minimizing wavelength fragmentation determined considering the wavelengths usage on the cross-links. Wavelength selection begins as shown at step 40, when WAM 24 determines the distance between the optical terminals, e.g. nodes N1 and N5 in FIG. 4A. It also identifies all wavelengths that are used on cross-links at the nodes along the optical path, namely nodes N1-N4. This information is available from the data topology system 15 (see FIG. 1).

At the same time, the links of the path are identified (links N1-N2, N2-N3, N3-N4 and N4-N5 in FIG. 4A), step 41, and the effective load of each link in path OP is calculated as described later, shown in step 42.

At step 43, the wavelength reach table of choice is consulted for identifying the wavelengths that are free for the entire OP, i.e. are not used on any of the links N1-N2, N2-N3, N3-N4 and N4-N5 by other connections. The respective reach table is used as indicated above, according to the estimated effective load, required reach, wavelength spacing, and/or fiber type, etc, to find k wavelengths that are free and have a reach R≧D. If less than k wavelengths are available, then a set of as many wavelengths as possible are considered by the WAM 24. (This is also denoted with k in the flow-chart for simplification)

However, if no free wavelength is available for path OP, as shown by branch NO of decision block 44, then the routing management 10 may try to solve this problem by re-placing the regenerators, or by switching in a wavelength converter at a certain intermediate node N2-N4 of the optical path, as shown by step 45. This is the object of the '901 Application identified above. Alternatively, a wavelength upgrade may be attempted, as seen later.

If k>0, the WAM 24 proceeds to step 46. Now, all nodes and cross-links of optical path OP are identified, and also all the wavelengths that are in use on the cross-links are listed, to determine a link usage value for each wavelength identified in step 41. The list of wavelength usage for the available wavelengths is determined in step 46. For the example of FIG. 4A, the usage is: $\lambda 2=2$, $\lambda 3=6$, and $\lambda 5=2$. As indicated above, the usage value is based on the number of times each wavelength is used in the cross-links of the optical path.

A step 47, the wavelength $\lambda 3$ having the highest usage value among the k (three) available wavelengths ($\lambda 2$, $\lambda 3$, $\lambda 5$) is identified, and selected for the path OP. WAM 24 then returns operation to RM 10 for the next assignment, step 48.

As shown in step 42, the effective load value for the entire optical path is needed for optimizing wavelength selection on each optical path. Some of the links of the OP may carry a different number of wavelengths as shown on link N3-N4 which carries $\lambda 1$, $\lambda 4$ and $\lambda 10$. The effective load for the entire optical path is determined based on the current load value of each link of the respective path. The load of a link is defined as the ratio between the total number of wavelengths in use divided by the sum of unassigned wavelengths and those in use.

FIG. 4C shows an example of an optical path OP with multiple links Link1 to Link4, and multiple fibers on some of the links, for explaining how the effective load value for the optical path is determined in step 42 of FIG. 4B. In this example, links Link2 and Link3 have each two fibers Fiber1 and Fiber2.

The effective load for an optical path comprising various fiber-types and links with multiple fibers is determined in a two-step process:

(1) for links that have multiple fibers, the link load is considered the minimum of the loads on all fibers $\text{Load}_{Link2}=\text{Min}(\text{Fiber1}, \text{Fiber2})$ (2) for the entire path, the load is considered the maximum of the loads on all links: $\text{Load}_{OP}=\text{Max}(\text{Link1}, \text{Link2}, \text{Link3}, \text{Link4})$ Alternatively, loads on the links along a certain path may be averaged, and the path load is in this case a weighted sum: $\text{Load}_{OP}=w1\text{Link1}+w2\text{Link2}+w3\text{Link3}+w4\text{Link4}$). In this case, the weights are proportional to the respective link lengths.

Figure 5A:
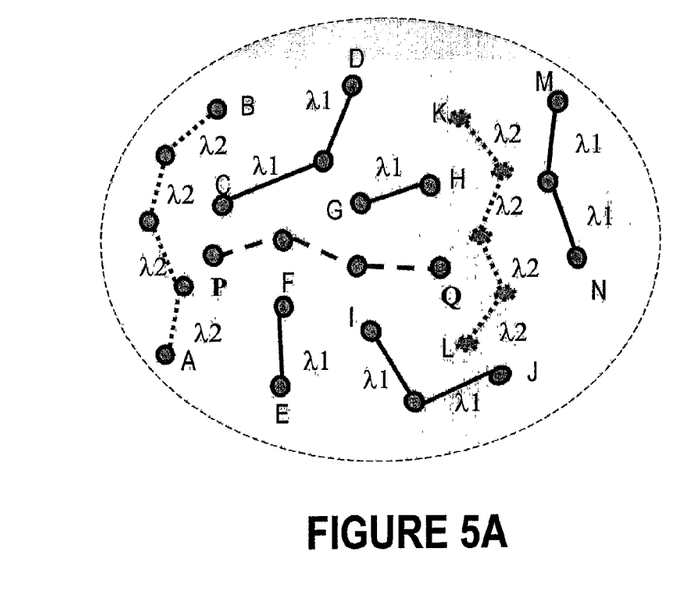
FIG. 5A illustrates how wavelength fragmentation is addresses in the context of the entire network.

FIG. 5A illustrates how wavelength assignment is optimized considering the wavelengths usage on all links in the photonic network. The most used wavelengths are now defined with respect to the number of links on which they are used throughout the network. The example of FIG. 5A considers $\lambda 1$ and $\lambda 2$ as only available wavelengths for the OP P-Q. Network-wide, both $\lambda 1$ and $\lambda 2$ are being used on eight links. However, $\lambda 1$ is used on five optical paths C-D, E-F, G-H, I-J and M-N (five contiguous sets of nodes), and X2 is used only on two optical paths A-B and K-L (two contiguous sets of nodes). This observation suggests that use of $\lambda 1$ is currently more scattered around in the network than the use of $\lambda 2$. Assigning $\lambda 1$ to the optical path P-Q would result in lesser fragmentation network-wide, as compared to assigning $\lambda 2$ to this path.

It should be recognized that sometimes two contiguous sets of nodes over which a wavelength is used can cross each other and this needs, to be factored into the computation of the individual participation of a wavelength to network fragmentation.

Figure 5B:
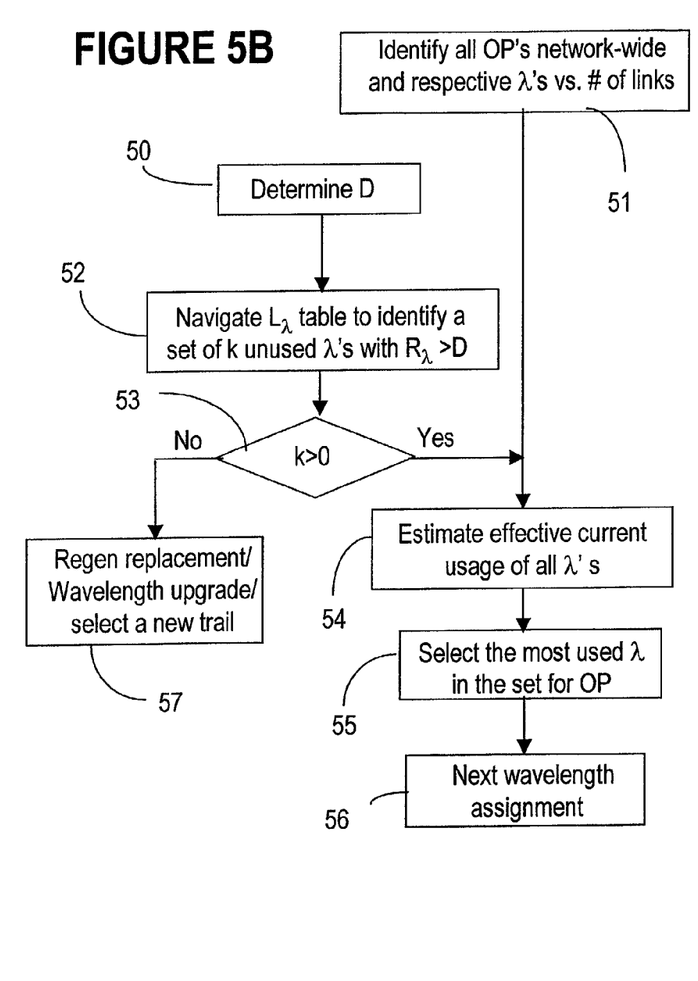
FIG. 5B is a flowchart illustrating a method for minimizing wavelength fragmentation over an entire switched optical network.

FIG. 5B is a flowchart illustrating a method of selecting wavelengths for a new connection with minimization of fragmentation over an entire photonic network. This flow-chart is described in connection with the example of FIG. 5A. First, the WAM 24 determines the distance D between nodes P and Q in step 50, from the DTS 15. All wavelengths that are not used on optical path P-Q, and that have a reach D or more are identified in step 52. As before, this operation implies navigating through one of the tables described above. If no wavelength may be assigned to path P-Q, as shown by branch NO of decision block 53, WAM 24 returns the operation to routing management for a regenerator replacement, wavelengths upgrade, or for selecting another trial from list 26, step 57.

At the same time, as shown by step 51, WAM 24 identifies all active optical paths in the switched optical network, again using the DTS 15. The number of links used for each wavelength is also determined in this step.

If a certain number of wavelengths k>0 has been identified in step 53, WAM estimates a usage measure for each wavelength in step 54. The usage measure may be estimated in a number of ways; an example is provided here.

For example, WAM may determine the total number of links over which a wavelength is used in the network. In the example of FIG. 5A, both $\lambda 1$ and $\lambda 2$ are used on eight links. Next, WAM determines the number of contiguous nodes over which each wavelength is used. In the example of FIG. 5A, $\lambda 1$ is used on five optical paths, with the maximum number of contiguous nodes of 3 (for optical path C-D, I-J, and M-N which have 3 nodes), while the number of contiguous nodes for $\lambda 2$ is five (for optical paths A-B and L-K, which have five nodes each). The number of contiguous nodes is a measure of continuity of a wavelength in the network, and inversely correlates to fragmentation. Thus, while $\lambda 1$ and $\lambda 2$ are equally used in terms of number of links, $\lambda 2$ has a higher count of contiguous nodes. Accordingly, $\lambda 2$ can be argued to be less fragmented than $\lambda 1$. The network operator may select one option or a combination of both. It is also apparent that other ways of determining the wavelength usage measure network-wide are possible. After the most used wavelength has been selected for OP in step 55, the WAM returns operation to the RM 10 for the next assignment, step 56.

If a fine-grained wavelength-binning table is available, then finding an upgraded wavelength may also take granularity into consideration. To achieve this, a Q-R (signal quality versus reach) graph is provided according to the invention, shown in FIG. 6A. This graph is provisioned based on a priori link engineering studies, and may also be pre-stored for example in database 25. It may again be provided for various types of fibers; varies with the fiber type.

Figure 6A:
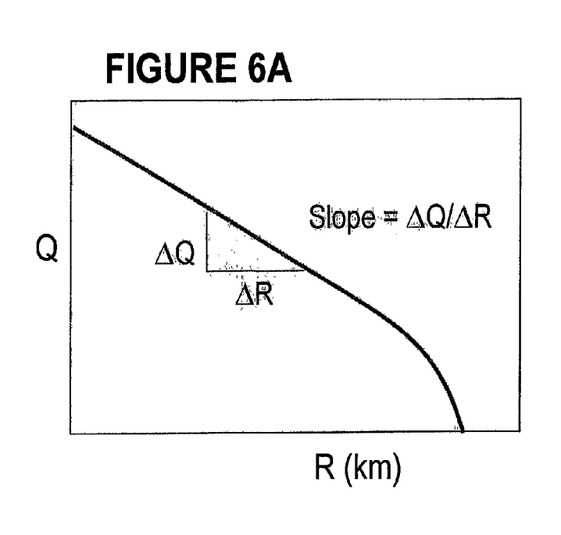
FIG. 6A is an example of a signal quality versus reach (Q-R) plot.

The Q-R plot of FIG. 6A is used to determine the number of bins (n) that should be skipped in a fine-grained wavelength-binning table for efficiently searching the available wavelengths and finding a wavelength that can be expected to make-up the difference in reach, or the short-fall in Q value.

Figure 6B:
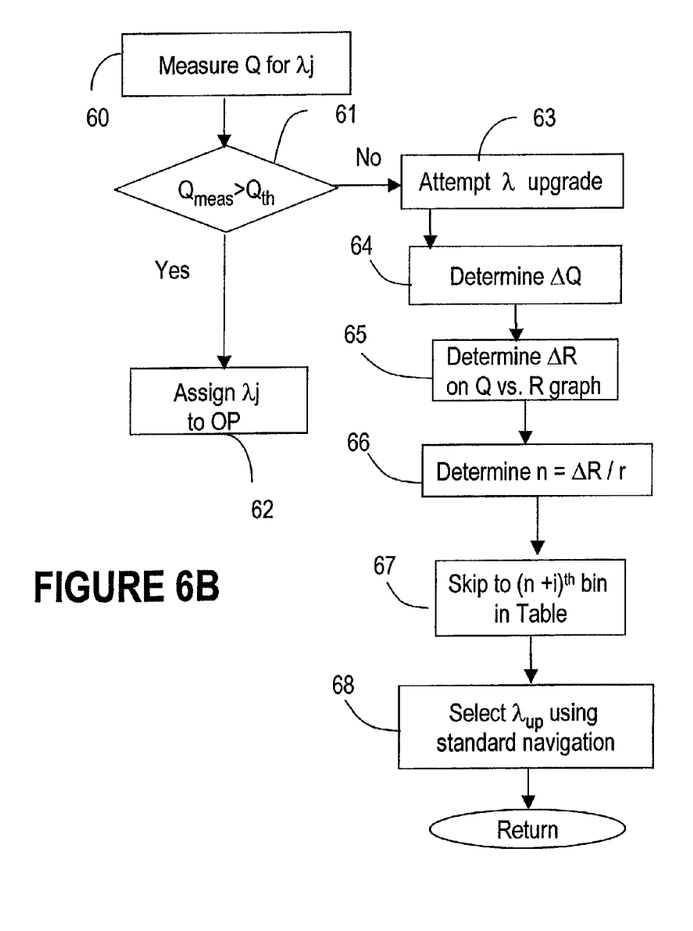
FIG. 6B is a flowchart illustrating a method for upgrading a wavelength using a fine-grained wavelength reach table.

FIG. 6B is a flow-chart showing the process of finding a wavelength upgrade using the Q-R graph and a wavelength binning table with fine granularity. Let's assume that a wavelength $\lambda_j$ was selected for optical path OP, using whatever selection method. Let's also assume that on set-up, the measured performance of OP is acceptable, step 60, i.e. $Q_{meas}>Q_{th}$. In this case, $\lambda_j$ is assigned to the respective optical path, as shown by the YES branch of decision block 61 and step 62. If on the other hand, using $\lambda_j$ does not result in the expected performance for OP, branch NO of decision block 61, WAM 24 will attempt a wavelength upgrade, step 63. Now, WAM 24 determines ΔQ in step 64, which is the amount by which $Q_{meas}$ for the previously selected wavelength $\lambda_j$ was lower compared with the required value $Q_{th}$. Next, in step 65, WAM determines the distance ΔR using Q-R graph of FIG. 6A. ΔR gives the distance by which wavelength search must advance in the fine-granularity wavelength reach table.

To determine n (the number of bins that should be skipped), the incremental distance ΔR is divided to the reach granularity 'r' available for the respective table, so that n=ΔR/r as shown in step 66. This means that WAM 24 advances the search to cell (n+i) along the range dimension, as shown by step 67. Here 'i' is the range of the bin corresponding to the previously selected wavelength $\lambda_j$. From this point on, the new wavelength $\lambda_{up}$ is selected by navigating the table as explained before, shown by step 68.

We claim:

1. In an automatically switched optical network operating according to a wavelength plan, a method of assigning a wavelength to an optical path, comprising:
    organizing all wavelengths provided by said wavelength plan in a binning table according to natural wavelength reaches and a specified wavelength or fiber specific parameter;
    determining the length of said optical path and the value of said wavelength or fiber specific parameter for said optical path; and
    searching said binning table to select a wavelength for said optical path based on availability of said wavelength on said optical path, the length of said optical path and the value of said wavelength or fiber specific parameter,
    wherein said step of searching comprises:
        identifying in said binning table a first bin with a wavelength reach corresponding to the length of said optical path, and a wavelength spacing corresponding to said wavelength plan;
        in said first bin, identifying a wavelength that is currently unused on said optical path and selecting said wavelength for said optical path; and whenever a wavelength is not currently available in said first bin,
        navigating said table to a second bin with a narrower wavelength spacing; and in said second bin, identifying a wavelength that is currently unused on said optical path and selecting said wavelength for said optical path.

2. A method as claimed in claim 1, further comprising navigating said table to a third bin with next higher reach, to select said wavelength for optical path, whenever a wavelength is not currently available in said second bin.

3. A method as claimed in claim 1, further comprising attempting to set-up a connection along said path using said wavelength.

4. A method as claimed in claim 3, wherein said step of attempting comprises calculating an estimated performance parameter for said optical path and comparing said estimated performance parameter with acceptability threshold.

5. A method as claimed in claim 4, further comprising performing a wavelength upgrade, whenever said estimated parameter is lower than said acceptability threshold.

6. A method as claimed in claim 5, wherein said wavelength upgrade comprises replacing said wavelength with an upgraded wavelength selected from a higher bin.

7. A method as claimed in claim 4, wherein said estimated performance parameter is an estimated Q factor.

8. In an automatically switched optical network operating according to a wavelength plan, a method of assigning a wavelength to an optical path, comprising:
    organizing all wavelengths provided by said wavelength plan in a binning table according to natural wavelength reaches and a specified wavelength or fiber specific parameter;
    determining the length of said optical path and the value of said wavelength or fiber specific parameter for said optical path;
    searching said binning table to select a wavelength for said optical path based on availability of said wavelength on said optical path, the length of said optical path and the value of said wavelength or fiber specific parameter; and
    providing said network with a Q factor-Reach graph,
    wherein each step of searching comprises:
        identifying in said binning table a first bin with a wavelength reach corresponding to the length of said optical path;
        selecting in said first bin, wavelength for said optical path based on availability of said wavelengths on said optical paths;
        calculating an estimated Q factor for said wavelength and comparing said estimated Q factor with an acceptability threshold whenever said estimate parameter is lower than said acceptability threshold:
        calculating the difference ΔQ between said acceptability threshold and said estimated Q factor;
        determining on said graph the number 'n' of bins between said first bin and a next bin to be searched based on ΔQ and the length of said optical path;
        navigating from said first bin to a 'n+1'th bin, and identifying in said 'n+1'th bin a wavelength for said optical path.

9. A method as claimed in claim 8, wherein said searching step further includes selecting said wavelength based on a search time available for selecting said wavelength.

10. In an automatically switched optical network operating according to a wavelength to an optical path, a method comprising:
    organizing all wavelengths provided by said wavelength plan in a binning table according to the natural wavelength reach and wavelength spacing;
    determining the length of said optical path and the value of said wavelength spacing for said optical path; and
    searching said binning table to select a wavelength for said optical path based on availability of said wavelength on said optical path, the length of said optical path and the value of said spacing,
    wherein said step of searching comprises:
        identifying in said binning table a first bin with a wavelength reach corresponding to the length of said optical path, and the wavelength spacing corresponding to said wavelength plan;
        in said first bin, identifying a wavelength that is currently unused on said optical path and selecting said wavelength for said optical path; and whenever a wavelength is not currently available in said first bin,
        navigating said table to a second bin with a narrower wavelength spacing; and in said second bin, identifying a wavelength that is currently unused on said optical path and selecting said wavelength for said optical path.

11. The method as claimed in claim 10, further comprising navigating said table to a third bin with next higher reach, to select said wavelength for optical path, whenever a wavelength is not currently available in said second bin.

12. The method as claimed in claim 10, further comprising attempting to set-up a connection along said path using said wavelength.

13. The method as claimed in claim 12, wherein said step of attempting comprises calculating an estimated performance parameter for said optical path and comparing said estimated performance parameter with acceptability threshold.

14. The method as claimed in claim 13, further comprising performing a wavelength upgrade, whenever said estimated parameter is lower than said acceptability threshold.

15. The method as claimed in claim 14, wherein said wavelength upgrade comprises replacing said wavelength with an upgraded wavelength selected from a higher bin.

16. The method as claimed in claim 13, wherein said estimated performance parameter is an estimated Q factor.

17. In an automatically switched optical network operating according to a wavelength to an optical path, a method comprising:
   organizing all wavelengths provided by said wavelength plan in a binning table according to the natural wavelength reach and wavelength spacing;
   determining the length of said optical path and the value of said wavelength spacing for said optical path;
   searching said binning table to select a wavelength for said optical path based on availability of said wavelength on said optical path, the length of said optical path and the value of said spacing; and
   providing said network with a Q factor-Reach graph,
   wherein the step of searching comprises:
      identifying in said binning table a first bin with a wavelength reach corresponding to the length of said optical path;
      selecting in said first bin, wavelength for said optical path based on availability of said wavelengths on said optical paths;
      calculating an estimated Q factor for said wavelength and comparing said estimated Q factor with an acceptability threshold whenever said estimate parameter is lower than said acceptability threshold:
      calculating the difference $\Delta Q$ between said acceptability threshold and said estimated Q factor;
      determining on said graph the number 'n' of bins between said first bin and a next bin to be searched based on $\Delta Q$ and the length of said optical path;
      navigating from said first bin to a 'n+1'th bin, and identifying in said 'n+1'th bin a wavelength for said optical path.

* * * * *